United States Patent [19]

Kamada et al.

[11] Patent Number: 4,928,226

[45] Date of Patent: May 22, 1990

[54] DATA PROCESSOR FOR PARALLELLY EXECUTING CONFLICTING INSTRUCTIONS

[75] Inventors: Eiki Kamada; Yooichi Shintani, both of Hadano; Kazunori Kuriyama, Saitama; Tohru Shonai, Hadano; Kiyoshi Inoue, Tokyo, all of Japan

[73] Assignee: Hitachi, Ltd., Tokyo, Japan

[21] Appl. No.: 124,839

[22] Filed: Nov. 24, 1987

[30] Foreign Application Priority Data

Nov. 28, 1986 [JP] Japan ................. 61-281720

[51] Int. Cl.⁵ ............... G06F 9/38; G06F 9/00; G06F 7/38
[52] U.S. Cl. ............................................. 364/200
[58] Field of Search .......................... 364/700, 900

[56] References Cited

U.S. PATENT DOCUMENTS

| | | | |
|---|---|---|---|
| 4,398,245 | 8/1983 | Fujita | 364/200 |
| 4,507,728 | 3/1985 | Sakamoto et al. | 364/200 |
| 4,532,589 | 7/1985 | Shintani et al. | 364/200 |
| 4,541,047 | 9/1985 | Wada et al. | 364/200 |
| 4,626,989 | 12/1986 | Torii | 364/200 |
| 4,638,429 | 1/1987 | Watabe et al. | 364/200 |
| 4,639,886 | 1/1987 | Hashimoto et al. | 364/200 |
| 4,733,344 | 3/1988 | Watanabe et al. | 364/200 |
| 4,736,288 | 4/1988 | Shintani et al. | 364/200 |
| 4,739,470 | 4/1988 | Wada et al. | 364/200 |
| 4,752,873 | 6/1988 | Shorai et al. | 364/200 |

FOREIGN PATENT DOCUMENTS 46170 10/1981 Japan .
176151 10/1983 Japan .

OTHER PUBLICATIONS

Research disclosure, "Look-ahead and Instruction, Operand Queue Technique", Oct. 1987, No. 282, p. 28231.
Research disclosure, "Register and Operand Conflict Mechanism", Oct. 1987, No. 282, p. 28234.

*Primary Examiner*—Andrew J. James
*Assistant Examiner*—Viet Q. Nguyen
*Attorney, Agent, or Firm*—Antonelli, Terry, Stout & Kraus

[57] ABSTRACT

A data processor includes an instruction detection unit for detecting that a succeeding instruction writes a read-out operand into a general register group without subjecting it to arithmetic or logical operation, in accordance with instruction decode informations provided by an instruction hold unit; a conflict detection unit for detecting a conflicting state that the preceding instruction performs a write operation into a general register of the general register group and the succeeding instruction reads an operand from the same general register, in accordance with instruction decode informations provided by the instruction hold unit; and a contention detection unit for detecting a contention state that the preceding instruction performs a write operation into the same general register and the succeeding instruction also performs a write operation into the same general register, in accordance with instruction decode informations provided by the instruction hold unit.

7 Claims, 10 Drawing Sheets

L  Ra,Db(Xb Bb) ;  Ra←(Sb)····Sb=(Xb)+(Bb)+Db

AR  Rc,Rd         ; Rc←(Rc)+(Rd)

DATA PROCESSOR FOR PARALLELLY EXECUTING CONFLICTING INSTRUCTIONS

BACKGROUND OF THE INVENTION

The present invention relates to a data processor for parallelly executing plural instructions, and more particularly to a data processor suitable for executing plural instructions in a pipeline processing system (advanced control system).

In a data processor intended to speed up the processing by employing a system, e.g., a pipeline processing system, for processing plural instructions in parallel (including a system for processing instructions partially in an overlapped manner), if a preceding instruction writes an operation result in a register and a succeeding instruction uses the content of the same register to calculate an address, the succeeding instruction cannot start address calculation until the preceding instruction has written the operation result in the register, thus causing a delay in the processing. Such contention of data to be used in calculating an address is called "address conflict".

For the case where a preceding instruction is a so-called load instruction which writes a read-out operand in a register without subjecting it to arithmetic or logical operation and a succeeding instruction is in address conflict with the preceding instruction, a method of reducing a delay in the processing has been proposed in JP-A-56-46170 filed in the name of the present assignee.

If a preceding instruction writes an operation result in a register and a succeeding instruction reads an operand from the same register, the succeeding instruction cannot read the operand from the register until the preceding instruction has written the operation result in the register, thus causing a delay in the processing. Such operand contention on a register is called "register operand conflict" or simply "operand conflict".

According to a known conventional method of eliminating a delay in the processing to be caused by operand conflict, a short path for supplying an operation result of a preceding instruction to the input of an arithmetic or logical unit (ALU) is provided at an intermediate point of a write path of the ALU to a general purpose register, whereby the arithmetic or logical operation of a succeeding instruction which requires an operation result of the preceding instruction is performed without waiting for such a time when the operation result has been written in a designated general-purpose register. This method is called "a register operand wrap-around" or simply "operand wrap-around".

According to this method, if a preceding instruction is an instruction such as a LOAD instruction which requires no operation by an ALU, the operation of a succeeding instruction cannot start until the operation stage of the LOAD instruction has been completed.

SUMMARY OF THE INVENTION

It is an object of the present invention to provide a data processor capable of performing operations of both preceding and succeeding instructions at the same time even in the case of operand conflict between the instructions.

The above object can be achieved by the provision of a data processor which comprises a storage and a general register group for storing operands, operand hold means for storing operands read from said storage for a plurality of instructions and providing at least two operands; operand select means connected to said operand hold means and said general register group for selecting either one of the operands for a preceding instruction and a succeeding instruction; at least one arithmetic or logical means connected to said operand select means for performing an arithmetic or logical operation on selected operands; decode means for sequentially decoding instructions to be executed and generating instruction decode informations; instruction hold means for storing a plurality of instruction decode informations generated by said decode means and providing at least two instruction decode informations; instruction detection means for detecting that a succeeding instruction writes a read-out operand into said general register group without subjecting it to arithmetic or logical operation, in accordance with instruction decode informations provided by said instruction hold means; conflict detection means for detecting a conflicting state that said preceding instruction performs a write operation into a general register of said general register group and said succeeding instruction reads an operand from said general register, in accordance with instruction decode informations provided by said instruction hold means; and contention detection means for detecting a contention state that said preceding instruction performs a write operation into a general register of said general register group and said succeeding instruction also performs a write operation into said same general register, in accordance with instruction decode informations provided by said instruction hold means.

When said instruction detection means detects that a preceding instruction writes an operand into the general register group without subjecting it to arithmetic or logical operation, in accordance with instruction decode informations provided by said instruction hold means, said at least one arithmetic or logical means performs at least arithmetic or logical operations of the preceding and succeeding instructions at the same time.

When said conflict detection means detects a conflicting state that the preceding instruction performs a write operation into a general register of the general register group and the succeeding instruction reads an operand from the same general register, in accordance with instruction decode information provided by said instruction hold means, said operand select means supplies the operand for the preceding instruction to said at least one arithmetic or logical means which performs arithmetic or logical operation of the succeeding instruction, and said at least one arithmetic or logical means performs arithmetic or logical operations of the preceding instruction and the succeeding instructions at the same time.

When said contention detection means detects a contention state that the preceding instruction performs a write operation into a general register of the general register group and the succeeding instruction also performs a write operation into the same general register, in accordance with instruction decode informations provided by said instruction hold means, said contention detection means inhibits the write operation by the preceding instruction into the same general register.

DESCRIPTION OF THE PREFERRED EMBODIMENTS

A pipeline processing system to which the present invention is applied will now be described.

Figure 1:
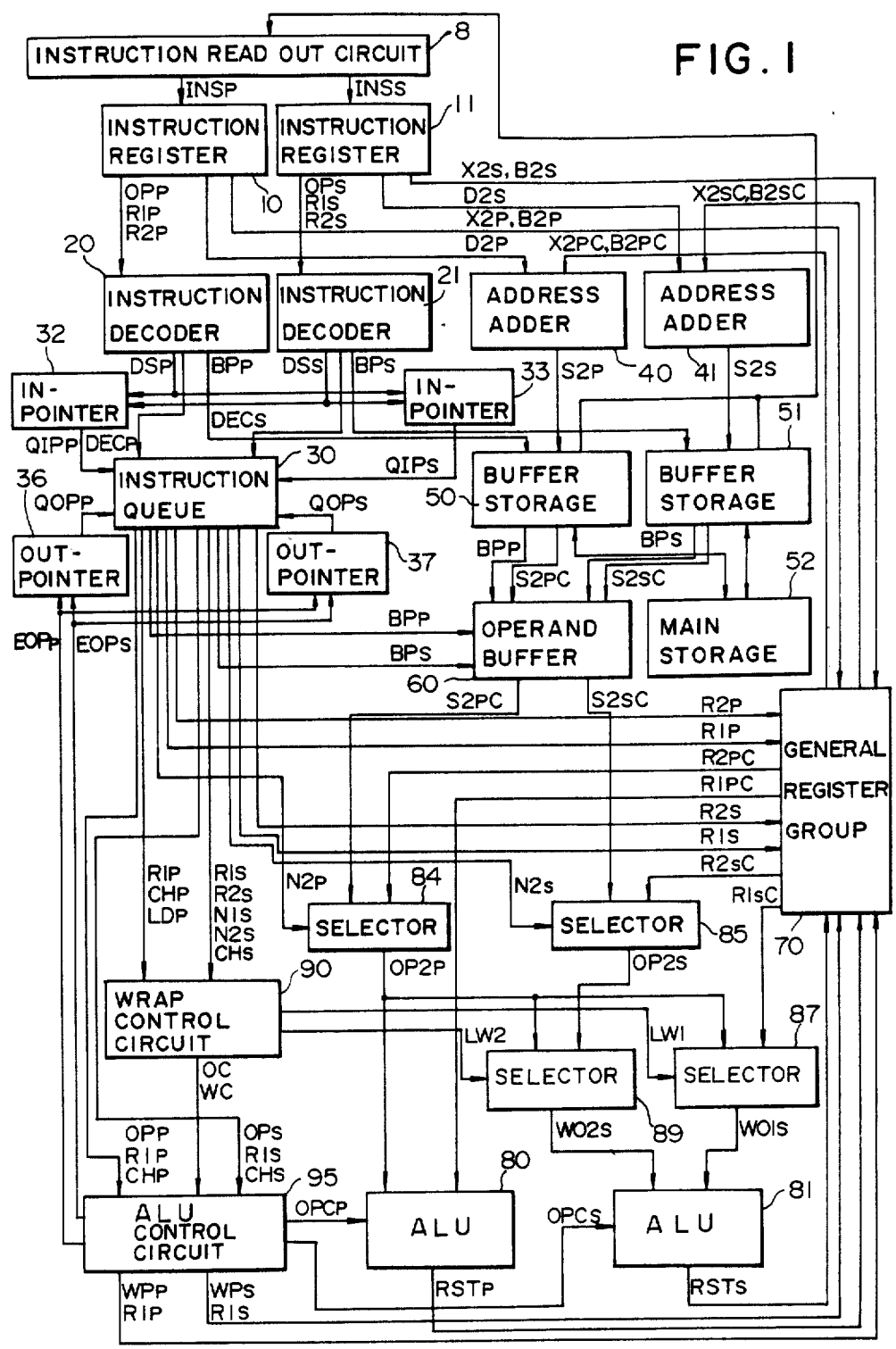
FIG. 1 is a block diagram showing an overall structure of an embodiment of the data processor according to the present invention.

FIG. 1 is a block diagram showing an overall structure of an embodiment of the data processor according to this invention. In this embodiment, the pipeline processing system executes two instructions in parallel. A prior art system for writing two instruction into two instruction registers of the pipeline processing system is disclosed, for example, in JP-A-58-176751.

Referring to FIG. 1, an instruction readout circuit 8 reads two instructions to be processed and sets them at instruction registers 10 and 11. The instruction register 10 holds a preceding instruction, while the instruction register 11 holds a succeeding instruction. An instruction decoder 20 (21) decodes a preceding (succeeding) instruction to generate instruction decode information used for controlling the circuitry of the data processor. An instruction queue 30 sequentially holds instruction decode informations generated by the instruction decoders 20 and 21 until a corresponding instruction starts being subjected to arithmetic or logical operation. An address adder 40 (41) calculates a logical address of a storage operand for a preceding (succeeding) instruction to be read from a buffer storage 50 (51). The buffer storages 50 and 51 hold instructions and data to be processed. An operand buffer 60 sequentially holds storage operands read from the buffer storages 50 and 51 until a corresponding instruction starts being subjected to arithmetic or logical operation. A general purpose register group 70 is constructed of a group of registers and mainly holds data (such as register operand, address modifying data and the like) frequently used. An ALU 80 (81) performs arithmetic or logical operation designated by a preceding (succeeding) instruction. A wrap control circuit 90 and an ALU control circuit 95 are necessary for realizing the present invention and are described later in detail.

Figure 2A:
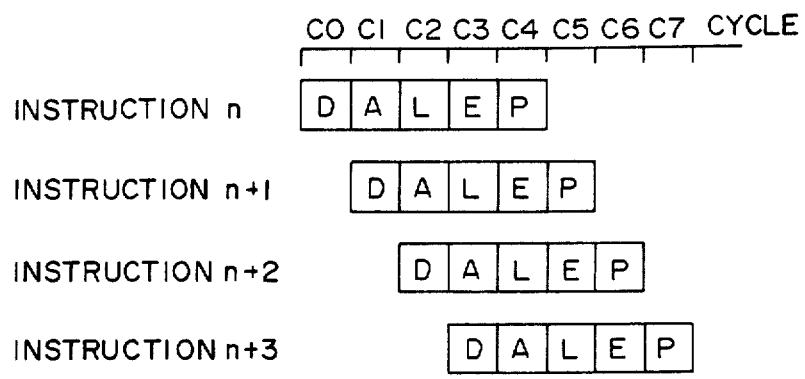
FIG. 2A is a timing chart illustrating a flow of executing instructions in a conventional pipeline processing system.
Figure 2B:
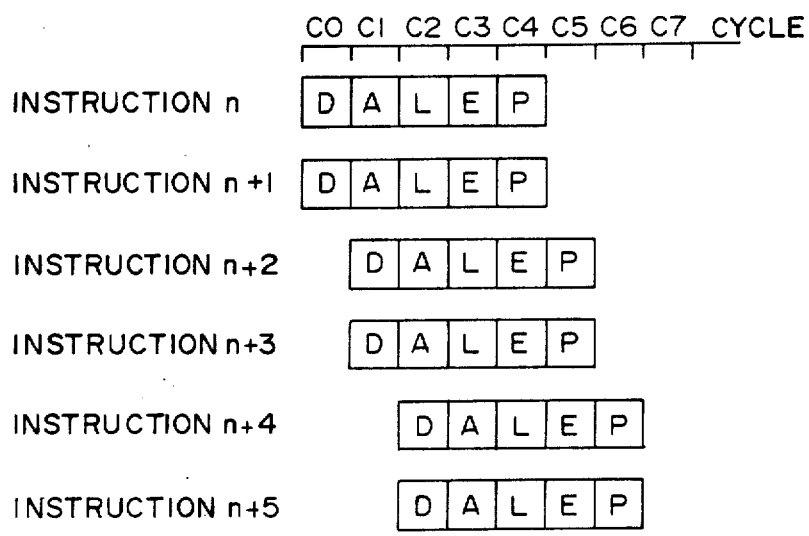
FIG. 2B is a timing chart illustrating a flow of executing instructions in another conventional parallel pipeline processing system.

FIGS. 2A and 2B are timing charts illustrating the standard flow of executing instructions in a pipeline processing system, wherein the abscissa represents a time basis. The time basis is graduated in units of cycles, each cycle being referred to as C0, C1, C2, . . . in this order starting from an initial cycle (at the left end in the chart).

FIG. 2A shows the flow of executing instructions wherein an instruction is sequentially processed one by one, whereas FIG. 2B shows the flow of executing instructions wherein two instructions are sequentially processed in parallel. The instruction processing is divided into a plurality of process stages, each process stage being sequentially presented to a plurality of instructions and operated in parallel with others. Referring to FIG. 2B, first an instruction n and an instruction n+1 undergo stage D at cycle C0. The instructions n and n+1 then advance to stage A at cycle C1 whereat two instructions immediately after the two instructions n and n+1 start being processed at stage D. Next, at cycle C2 the instructions n and n+1 advance to stage L, the next two instructions advance to stage A, and the second next two instructions start being processed at stage D. In this manner, a plurality of succeeding instructions are processed in parallel at each process stage. Therefore, a plurality of instructions are processed at respective process stages for a certain cycle time in parallel and in an overlap manner at the same time, thus reducing an entire instruction processing time.

An instruction is processed at each stage called D, A, L, E and P stage in this order for a unit cycle time. Particularly, referring back to FIG. 1, at stage D instructions held in the instruction registers 10 and 11 are decoded by the instruction decoders 20 and 21 and undergo address calculation by the address adders 40 and 41 to obtain the logical addresses of corresponding storage operands. At the next stage A, translation from logical addresses to physical addresses and reading of storage operands are carried out at the buffer storages 50 and 51. At the following stage L, the storage operands read from the buffer storages 50 and 51 are transferred to the operand buffer 60 and then to the ALUs 80 and 81. Register operands are also read from the general register group 70 and transferred to the ALUs 80 and 81. The above operations provide a preparation for starting arithmetic or logical operations designated by instructions to be executed by the ALUs 80 and 81. At stage E, arithmetic operation is executed by the ALUs 80 and 81. At stage P, the operation results from the ALUs 80 and 81 are written into the general register group 70.

Figures 3, 4:
FIG. 3 shows instruction formats used with the processor shown in FIG. 1.
FIG. 4 shows an example of a series of instructions.

Instruction formats used in the following description of the embodiments will now be described. FIG. 3 shows instruction formats called an RR type and an RX type. An RR type instruction is composed of an OP field, R1 field and R2 field. An RX type instruction is composed of an OP field, R1 field, X2 field, B2 field and D2 field. The OP field indicates the type of arithmetic or logical operation to be executed by the ALUs 80 or 81. The R1, R2, X2 and B2 fields each indicate a register in the general register group 70. The R1 and R2 fields indicate the registers in which first and second operands are stored, respectively. The contents of the registers designated by the X2 and B2 fields are added to the content of the D2 field by the address address 40 or 41 to produce a logical address of a second operand stored in the buffer storages 50 or 51. Generally, in the case of the RR type instruction and the RX type instruction, first and second operands are read and subjected to arithmetic or logical operation to thereafter write the operation result into the register which stored the first operand. However, in the case of a LOAD instruction, a second operand is read and directly written in the register designated by the first operand without performing arithmetic or logical operation.

FIG. 4 shows an example of a series of instructions using a so-called LOAD instruction as a preceding instruction. For the LOAD instruction, the logical address Sb of the second operand (Sb) stored in the storage can be obtained by adding the contents (Xb) and (Bb) of the registers designated by Xb and Bb to the value Db itself. The preceding instruction L writes the second operand (Sb) designated by the logical address Sb into a register Ra. A succeeding instruction AR herein used as an example is an addition instruction between registers. In this case, the first operand is the content (Rc) of a register designated by Rc, while the second operand is the content (Rd) of a register designated by Rd. The succeeding instruction AR adds (Rc) to (Rd) to write the result in the register Rc. It is noted however that in the case of Rc=Ra or Rd=Ra, the succeeding instruction AR cannot start reading an operand from a register until the preceding instruction L has written the operand in the register. This condition is called register operand conflict or simply operand conflict.

FIGS. 5A to 5D are timing charts showing the flow of executing two instructions in parallel including the series of instructions shown in FIG. 4.

Figure 5A:
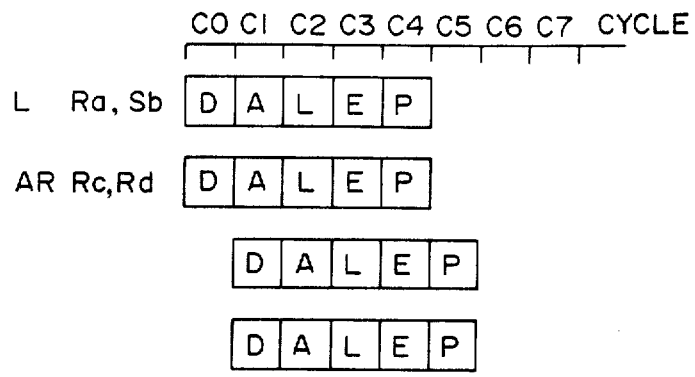
FIG. 5A is a timing chart illustrating a flow of executing the series of instructions shown in FIG. 4 in accordance with a prior art.

The timing chart shown in FIG. 5A illustrates the case where there occurs no operand conflict (Rc≠Ra and Rd≠Ra) between the preceding instruction L and the succeeding instruction AR shown in FIG. 4. In this case, the flow of executing instructions is the same as the standard one in the pipeline processing shown in FIG. 2B, thus providing no delay in the processing.

Figure 5B:
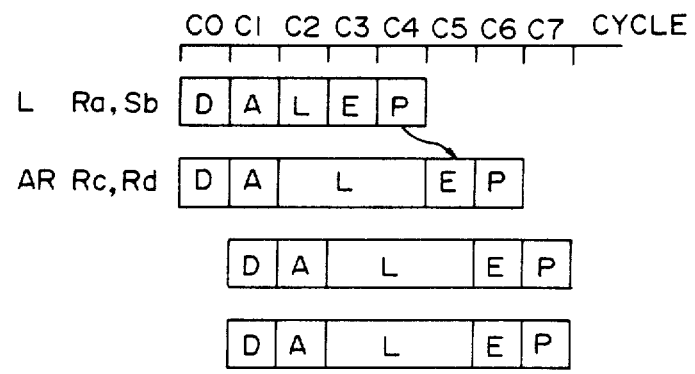
FIG. 5B is another timing chart illustrating a flow of executing the series of instructions shown in FIG. 4 in accordance with the prior art.

The timing chart shown in FIG. 5B illustrates the case where there occurs operand conflict (Rc=Ra or Rd=Ra) between the preceding instruction L and the succeeding instruction AR shown in FIG. 4. In this case, at least one of the operands [(Rc) and (Rd)] to be read by the succeeding instruction AR is the content written in the register Ra by the preceding instruction L. Stage P where the preceding instruction performs a write operation into the register Ra is carried out during cycle C4. Therefore, stage L where the succeeding instruction AR reads the operands from the registers Rc and Rd cannot start prior to cycle C4. Now, consider stage E where arithmetic or logical operation is performed. There arises a two cycle delay in the processing of AR and following instructions as compared to the case of no operand conflict.

Figure 5C:
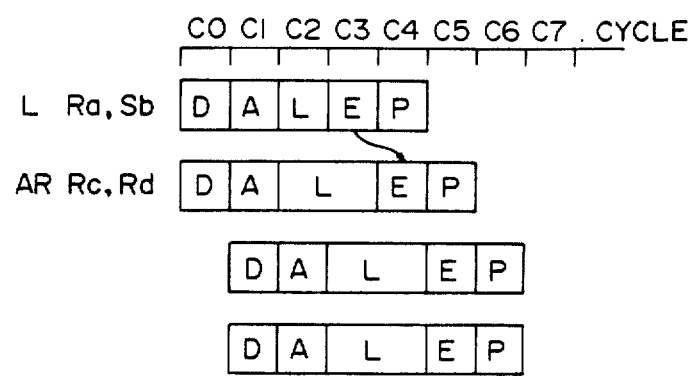
FIG. 5C is a timing chart illustrating a flow of executing the series of instructions shown in FIG. 4 in accordance with another prior art.

The timing chart shown in FIG. 5C illustrates the case where there occurs operand conflict (Rc=Ra or Rd=Ra) between the preceding instruction L and the succeeding instruction AR shown in FIG. 4, and where a conventional known operand wrap-around is employed. Also in this case, at least one of the operands [(Rc) and (Rd)] to be read by the succeeding instruction AR is the content written in the register Ra by the preceding instruction L. However, use of operand wrap-around makes it possible to read the operand not from the register but from the short path, at stage L of the succeeding instruction AR. The operand to be read from the short path can be identified at the latest before stage E during cycle C3 has been fully completed. Therefore, stage L of the succeeding instruction AR can be finished by cycle C3. Now, consider stage E where arithmetic or logical operation is performed. There arises a one cycle delay in the processing of AR and following instructions as compared to the case of no operand conflict.

In the processing of the series of instructions shown in FIG. 4, the second operand (Sb) of the preceding instruction L read from the buffer storage and written into the operand buffer 60 is directly written into the register Ra without being subjected to arithmetic or logical operation by the ALU. Therefore, in the case of operand conflict between the preceding instruction L and the succeeding instruction AR, the operand (Ra) read from the register Ra by the succeeding instruction AR is identical to the operand (Sb) read by the preceding instruction L from the buffer storage and written into the operand buffer 60. According to the present invention, the succeeding instruction AR can read the operand, not from the register of the general register group in which the preceding instruction L writes the operation result, but from the resource (in this case, operand buffer) from which the preceding instruction read the operand.

Figure 5D:
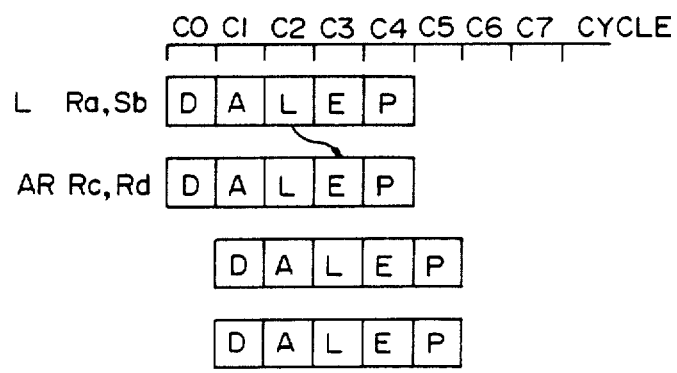
FIG. 5D is a timing chart illustrating a flow of executing the series of instructions shown in FIG. 4 in accordance with the present invention.

The timing chart shown in FIG. 5D illustrates the case where there occurs operand conflict (Rc=Ra or RD=Ra) between the preceding instruction L and the succeeding instruction AR shown in FIG. 4, and where the present invention is practiced. According to the present invention, the succeeding instruction AR can read at stage L the operand not from the general register group but from the operand buffer 60. The operand to be read from the operand buffer 60 can be identified at the latest before stage L of the preceding instruction L during cycle C2 has been completed. Therefore, stage L of the succeeding instruction AR can be finished by cycle C2. Now, consider stage E where arithmetic or logical operation is performed. It is possible to process the AR and following instructions at the same cycles as those in the case of no operand conflict.

Referring back to FIG. 1, the operation of the data processor constructed in accordance with the present invention will be described. In the following description, signals associated with a preceding instruction are represented by a symbol with suffix p and those associated with a succeeding instruction by a symbol with suffix s, to make them distinguishable.

A preceding instruction INSp (succeeding instruction INSs) set at the instruction register 10 (11) by the instruction readout circuit 8 is decoded and subjected to address calculation. Namely, the OP field OPp (OPs) of an instruction is decoded by the instruction decoder 20 (21) to generate instruction decode information DECp (DECs) which is used to control associated elements in the processor. Instruction decode informations DECp (DECs) which are relevant to the present invention are shown in the following:

OPp (OPs) ... designates the type of arithmetic or logical operation to be executed by the ALU 80 or 81.

N1p (n1s) ... indicates that a first operand is read from the general register group 70.

N2p (n2s) ... indicates that a second operand is read from the general register group 70.

CHp (CHs) . . . indicates that an operation result is written into the general register group 70.

LDp (LDs) . . . indicates a LOAD instruction (for transferring a second operand in the storage or in a register to another register).

BPp (BPs) . . . identifies the entry of the operand buffer 60 where an operand read from the buffer storage 50 (51) is held.

The instruction decode informations DECp (DECs) include further the following informations: The R1 field R1p (R1s) of an instruction identifies a register of the general register group 70 from which a first operand is read and into which an operation result is written. In the case of an RR type instruction, the R2 field R2p (R2s) hereof identifies a register of the general register group 70 from which a second operand is read. Alternatively, in the case of an Rx type instruction, the X2 field X2p (X2s) and the B2 field B2p (B2s) thereof identify registers of the general register group 70 which are used to calculate a logical address S2p (S2s) of an operand to be read from the buffer storage 50 (51). The above-described instruction decode informations DECp (DECs) are sequentially stored in the instruction queue 30.

In the case of an RX type instruction, simultaneously when an instruction is decoded by the instruction decoder 20 (21), the logical address S2p (S2s) of an operand to be read from the buffer storage 50 (51) is calculated by the address adder 40 (41). Particularly, the contents X2pC and B2pC (X2sC and B2sC) of the registers of the general register group 70 respectively identified by the X2 field X2p (X2s) and the B2 field B2p (B2s) of the instruction are added to the D2 field D2p (D2s) by the address adder 40 (41) and the result is sent to the buffer storage 50 (51). Also sent to the buffer storage 50 (51) at this time is the instruction decode information BPp (BPs) which identifies the entry of the operand buffer 60 where a read-out operand is held.

When the buffer storage 50 (51) receives the logical address S2p (S2s) of the operand to be read, it translates the logical address into a physical address at stage A and reads the operand S2pC (S2sC) which together with the received instruction decode information BPp (BPs), is sent to the operand buffer 60. The buffer storage 50 (51) is generally a high speed and small capacity storage and is used in combination with a low speed and large capacity main storage 52. If an operand to be read is present in the buffer storage 50 (51), it is possible to read the operand in one cycle. However, if an operand to be read is not present in the buffer storage 50 (51), it takes several cycles because the associated operand must be read from the main storage 52, thus leading to a delay in the processing time at stage A.

The operand buffer 60 receives at stage L the operand S2pC (S2sC) sent from the buffer storage 50 (51) and the instruction decode information BPp (BPs). The received operand S2pC (S2sC) is held at the entry of the operand buffer 60 identified by the instruction decode information BPp (BPs).

An instruction is executed by the ALUs 80 and 81 on the condition that the instruction decode informations DECp (DECs) are held in the instruction queue 30, an operand S2pC (S2sC) to be read, if the instruction is RX type, from the buffer storage 50 (51) is held in the operand buffer 60, and the ALUs 80 and 81 has completed arithmetic or logical operations of the preceding instruction. If such conditions are met, various control signals of the instruction decode informations DECp (DECp) are sent from the instruction queue 30 to the associated elements of the information processor. Thus, it is possible to read a storage operand S2pC (S2sC) held at the entry identified by the instruction decode information BPp (BPs) sent to the operand buffer 60 from the instruction queue 30. Also read are register operands R1pC and R2pC (R1sC and R2sC) respectively identified by the instruction decode informations R1p (R1s) and R2p (R2s) sent to the general register group 70 from the instruction queue 30. One of the operand S2pC (S2sC) read from the operand buffer 60 and the operand R2pC (R2sC) read from the general register group 70 is selected by a selector 84 (85) which is controlled by the instruction decode information N2p (N2s) sent from the instruction queue 30, the selected one serving as the second operand OP2p (OP2s). In this case, the instruction decode information OPp (OPs) representative of the type of arithmetic or logical operation is sent to the ALU 80 (81) via the ALU control circuit 95. The operand of the succeeding instruction is sent to the ALU 81 via selectors 87 and 89 which are controlled by the wrap control circuit 90. The present invention is realized mainly by the wrap control circuit 90, ALU control circuit 95 and selectors 87 and 89, the details of which are described later.

The ALU 80 (81) executes at stage E an arithmetic or logical operation designated by the instruction decode information OPp (OPs), using the first operand R1pC (WO1s) and the second operand OP2p (WO2s) to obtain an operation result. A simple arithmetic or logical operation can be performed usually in one cycle. But, a complicated arithmetic or logical operation requires several cycles, thus leading to a delay of stage E.

When an operation result RSTp (RSTs) is obtained by the ALU 80 (81) and a write enable signal WPp (WPs) is outputted from the ALU control circuit 95, the operation result RSTp (RSTs) is written at stage P into a register of the general register group 70 identified by the instruction decode information R1p (R1s).

The instruction queue 30 is provided in order to hold the instruction decode informations during the time from when an instruction has been decoded by the instruction decoder 20 or 21 to when an arithmetic or logical operation starts at the ALU 80 or 81. The operation of the instruction queue 30 will now be described in detail hereinafter.

The instruction queue 30 undergoes a first-in first-out (FIFO) control by means of in-pointers and out-pointers. In this embodiment, the instruction queue 30 is provided with two in-pointers 32 and 33 and two out-pointers 36 and 37. QIPp (QIPs) from the in-pointer 32 (33) indicates the entry where the instruction decode informations sent from the instruction decoder 20 (21) is held. QOPp (QOPs) from the out-pointer 36 (37) indicates the entry where the instruction decode informations to be sent to the associated elements in the data processor when an arithmetic operation by the ALU 80 (81) starts are held. QIPs from the in-pointer 33 and QOPs from the out-pointer 37 are controlled such that they always indicate the next entries to those indicated by QIPp from the in-pointer 32 and QOPp from the out-pointer 36, respectively. In this concern, it is possible to unite the two in-pointers and two out-pointers into one in-pointer and one out-pointer, respectively. After the instruction decoders 20 and 21 have decoded instructions held in the instruction registers 10 and 11, they send the instruction decode informations DECp and DECs to the instruction queue 30, and decode end signals DSp and DSs to the in-pointers 32 and 33. If both the instruction decoders 20 and 21 send the decode end signals DSp and DSs, the in-pointers 32 and 33 are incremented by two. If the instruction decoder 20 alone sends the decode end signal DSp, then the in-pointers 32 and 33 are incremented by one. If the instruction decoder 20 does not send the decode end signal DSp, the decode end signal DSs delivered by the instruction decoder 21 is inhibited, and the in-pointers 32 and 33 are not incremented. When arithmetic or logical operations for instructions have been completed by the ALUs 80 and 81, the ALU control circuit 95 delivers the write enable signals WPp and WPs to the general register group 70 to write therein the operation results RSTp and RSTs, and delivers arithmetic or logical operation end signals EOPp and EOPs for the ALUs 80 and 81 to the out-pointers 36 and 37. When the ALU control circuit 95 delivers both the operation end signals EOPp and EOPs for the ALUs 80 and 81, the out-pointers 36 and 37 are incremented by two. When the ALU control circuit 95 delivers only the operation end signal EOPp for the ALU 80, the out-pointers 36 and 37 are incremented by one.

Figure 6:
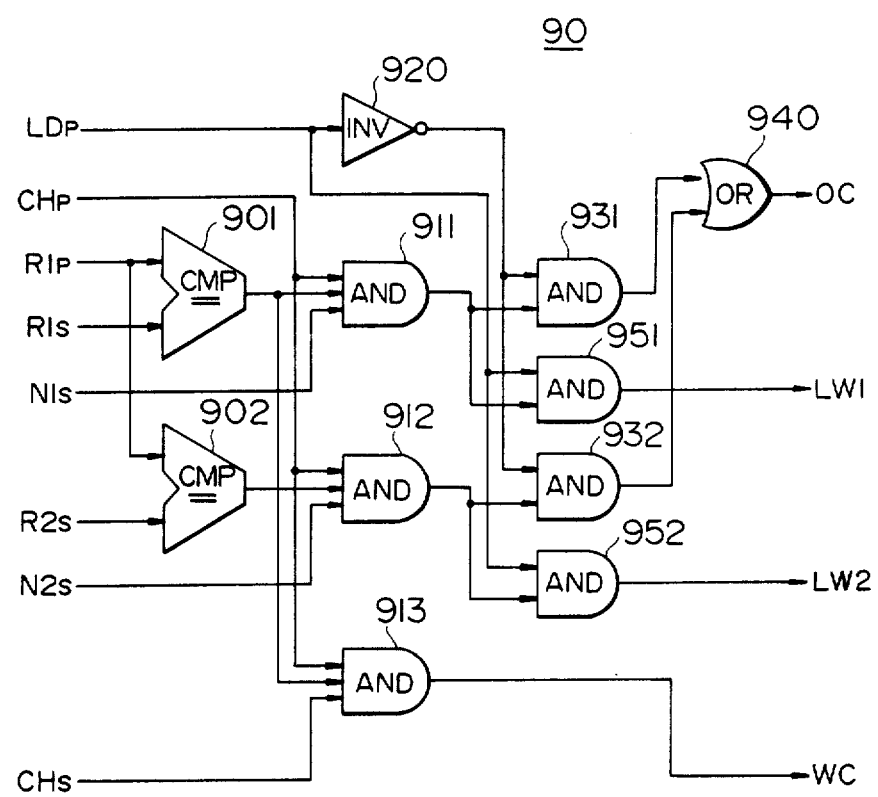
FIG. 6 is a detailed block diagram of the wrap control circuit 90 of the embodiment shown in FIG. 1.

According to the present invention aiming at solving a delay in the processing caused by operand conflict, if a preceding instruction in conflict with a succeeding instruction is a so-called LOAD instruction. the operand read by the preceding instruction is supplied to the succeeding instruction as an operand to be read by the succeeding instruction. In this embodiment, the wrap control circuit 90 operates to detect operand conflict and eliminate a delay in the processing to be caused by operand conflict FIG. 6 is a block diagram showing the internal structure of the wrap control circuit 90. Instruction decode informations for preceding and succeeding instructions for use in performing arithmetic or logical operation at the next cycle are sent to the wrap control circuit 90 from the instruction queue 30. The instruction decode informations for the preceding instruction have been held in the instruction queue 30 at the entry designated by QOPp from the out-pointer 36. On the other hand, the instruction decode informations for the succeeding instruction have been held in the instruction queue 30 at the entry designated by QOPs from the out-pointer 37.

Sent to the wrap control circuit 90 from the instruction queue 30 at the entry designated by QOPp from the out-pointer 36 are instruction decode information LDp indicative of the fact that the preceding instruction is a LOAD instruction, instruction decode information CHp indicative of the fact that the preceding instruction writes an operation result into the general register group 70, and instruction decode information R1p indicating the register into which the operation result is written. Also sent to the wrap control circuit 90 from the instruction queue 30 at the entry designated by QOPs from the out-pointer 37 are instruction decode information N1s indicative of the fact that the succeeding instruction reads a first operand from the general register group 70; instruction decode information CHs indicative of the fact that the succeeding instruction writes an operation result into the general register group 70, instruction decode information R1s indicating a register in which the operation result is written, instruction decode information N2s indicative of the fact that the succeeding instruction reads a second operand from the general register group 70, and instruction decode information R2s indicating a register from which the second operand is read. Using the above-noted instruction decode informations, the wrap control circuit 90 generates an operand conflict detection signal OC, operand wrap-around indicating signals LW1 and LW2 in the case where the preceding instruction is a LOAD instruction, and an inhibition signal WC for inhibiting a write operation of an operation result by the preceding instruction.

In the wrap control circuit shown in FIG. 6, R1p indicating a register into which the preceding instruction writes an operation result and R1s and R2s indicating the registers from which the succeeding instruction reads the operands are compared by comparators 901 and 902. Detected by AND gates 911 and 912 is the condition that the preceding instruction writes an operation result in a first register, the succeeding instruction reads an operand from a second register, and the first and second registers are the same one. In other words, the AND gates 911 and 912 detect an operand conflict based on the status of the first and second operands of the succeeding instruction. That the preceding instruction is not a so-called LOAD instruction is indicated by an output of an inverter 920. As a result, when the first and second operands are read by the succeeding instruction, the outputs of AND gates 931 and 932 indicate if an operand conflict has occurred between the succeeding instruction and the preceding instruction which is not a LOAD instruction. When either one of the AND gates 931 and 932 detects an operand conflict, an OR gate 940 outputs an operand conflict detection signal OC. However, in the case where the preceding instruction is a so-called LOAD instruction, if the AND gates 911 and 912 detect an operand conflict, then the AND gates 931 and 932 are inhibited from outputting the operand conflict detection signal OC. In this case, AND gates 951 and 952 output operand wrap-around indicating signals LW1 and LW2 for the corresponding first and second operands of the succeeding instruction. The condition that the preceding and succeeding instructions perform a write operation into registers and the registers are the same one is detected by an AND gate 913. In this case, not the operation result by the preceding instruction but the operation result by the succeeding instruction should be written in the register, so that a preceding instruction write inhibit signal WC is outputted from the AND gate 913.

Referring to FIG. 1, the selector 87 performs an ordinary operation to select, as a first operand WO1s to be sent to the ALU 81 which performs arithmetic or logical operation of the succeeding instruction, a first operand R1sC of the succeeding instruction in the case where the operand wrap-around indicating signal LW1 is not delivered and if delivered performs an operation to select as a first operand WO1s a second operand OP2p of the preceding instruction. On the other hand, the selector 89 performs an ordinary operation to select, as a second operand WO2s to be sent to the ALU 81, a second operand R2sC of the succeeding instruction in the case where the operand wrap-around indicating signal LW2 is not delivered, and if delivered, performs an operation to select as a second operand WO2s a second operand OP2p of the preceding instruction.

Figure 7:
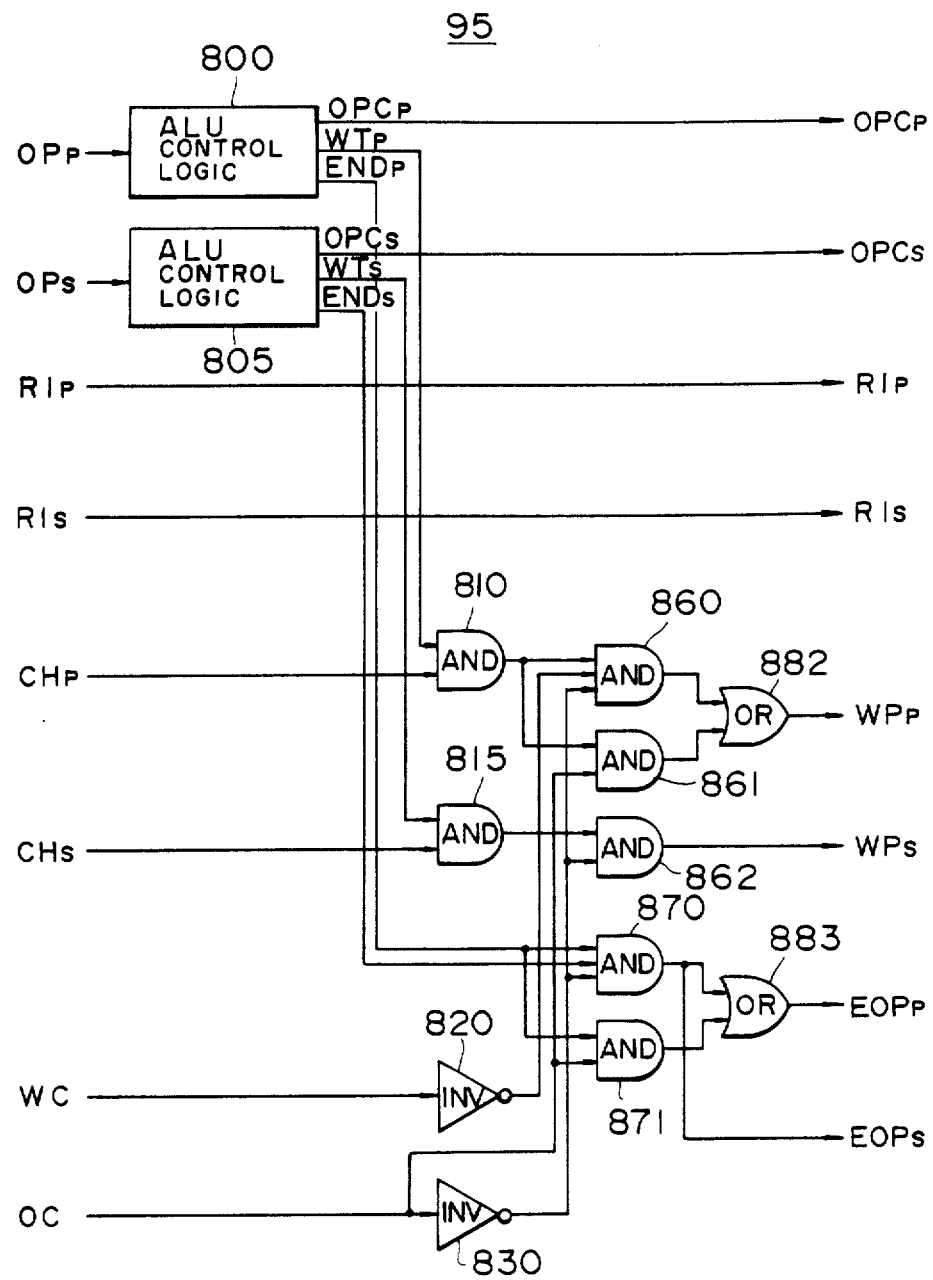
FIG. 7 is a detailed block diagram of the ALU control circuit 95 of the embodiment shown in FIG. 1.

FIG. 7 is a block diagram showing the internal structure of the ALU control circuit 95. Sent to the ALU control circuit 95 from the instruction queue 30 at the entry designated by QOPp from the out-pointer 36 are the instruction decode information OPp indicating the type of arithmetic or logical operations to be performed by the preceding instruction, the instruction decode information CHp indicative of that the preceding instruction writes an operation result into the general register group 70, and the instruction decode information R1p indicating the register into which the operation result is written. Also sent to the ALU control circuit 95 from the instruction queue 30 at the entry designated by QOPs from the out-pointer 37 are the instruction decode information OPs indicating the type of arithmetic or logical operations to be performed by the succeeding instruction, the instruction decode information CHs indicative of that the succeeding instruction writes an operation result into the general register group 70, and the instruction decode information R1s indicating the register into which the operation result is written. Also sent to the ALU circuit 95 from the wrap control circuit 90 are the operand conflict (between the preceding and succeeding instructions) detection signal OC and the write inhibit signal WC for inhibiting a write operation of the operation result by the preceding instruction.

In the ALU control circuit shown in FIG. 7, an ALU control logic 800 (805) generates various control signals necessary for the arithmetic or logical operation, based on the instruction decode information OPp (OPs) indicating the type of arithmetic or logical operations of the preceding (succeeding) instruction. The ALU control logics 800 and 805 may be constructed of wired-logics or may be realized by means of microprograms. The control signals relevant to the present invention will be described in the following:

OPCp (OPCs) . . . controls the arithmetic or logical operation of the preceding (succeeding) instruction by the ALU.

WTp (WTs) . . . indicates the write timing of an operation result by the preceding (succeeding) instruction.

ENDp (ENDs) . . . indicates the end of the arithmetic or logical operation by the preceding (succeeding) instruction.

The ALU control signal OPCp (OPCs) is sent to the ALU 80 (81) which performs an arithmetic or logical operation of the preceding (succeeding) instruction. The instruction decode information R1p (R1s) indicating the register into which an operation result by the preceding (succeeding) instruction is written is directly sent to the general register group 70. The instruction decode information CHp (CHs) indicative of that the preceding (succeeding) instruction writes an operation result into the general register group 70 is synchronized with the write timing WTp (WTs) at an AND gate 810 (815).

An output from an inverter 820 indicates that it is not necessary to inhibit a write operation of the operation result by the preceding instruction. An output from an inverter 830 indicates that there is not detected an operand conflict between the preceding and succeeding instructions. Accordingly, an output from an AND gate 860 allows a write operation of the operation result by the preceding instruction into the general register group 70 in the case where it is not necessary to inhibit a write operation of the operation result by the preceding instruction and there is not detected an operand conflict between the preceding and succeeding instructions. Further, an output from an AND gate 861 allows a write operation of the operation result by the preceding instruction into the general register group 70 in the case where there is detected an operand conflict between the preceding and succeeding instructions. When one of the AND gates 860 and 861 allows a write operation of the operation result, an OR gate 882 outputs a write enable signal WPp. Further, an AND gate 862 allows a write operation of the operation result by the succeeding instruction into the general register group 70 to output a write enable signal WPp for the succeeding instruction in the case where there is not detected an operand conflict between the preceding and succeeding instructions. The write enable signals WPp and WPs are sent to the general register group 70.

An output from an AND gate 870 indicates that the arithmetic or logical operations for both the preceding and succeeding instructions have been completed in the case where an operand conflict was not detected between the preceding and succeeding instructions. An output from an AND gate 871 indicates that the arithmetic or logical operation by the preceding instruction has been completed in the case where an operand conflict was detected between the preceding and succeeding instructions. When one of the AND gates 870 and 871 indicates the completion of an arithmetic or logical operation, an OR gate 883 outputs an operation end signal EOPp of the preceding instruction. Alternatively, an operation end signal EOPs of the succeeding instruction is outputted from the AND gate 870 when it indicates the completion of an arithmetic or logical operation by the succeeding instruction in the case where there is not detected an operand conflict between the preceding and succeeding instructions. In other words, if there is detected an operand conflict between the preceding and succeeding instructions and an operand conflict detection signal OC is sent from the wrap control circuit 90, the write enable signal WPs and the operation end signal EOPs of the succeeding instruction are inhibited, to accordingly suspend an arithmetic or logical operation by the succeeding instruction. The operation end signals EOPp and EOPs are sent to the out-pointers 36 and 37 to increment them.

With the above control sequence, the data processor shown in FIG. 1 can process the series of instructions shown in FIG. 4 in accordance with the timing chart shown in FIG. 5D.

Figure 8:
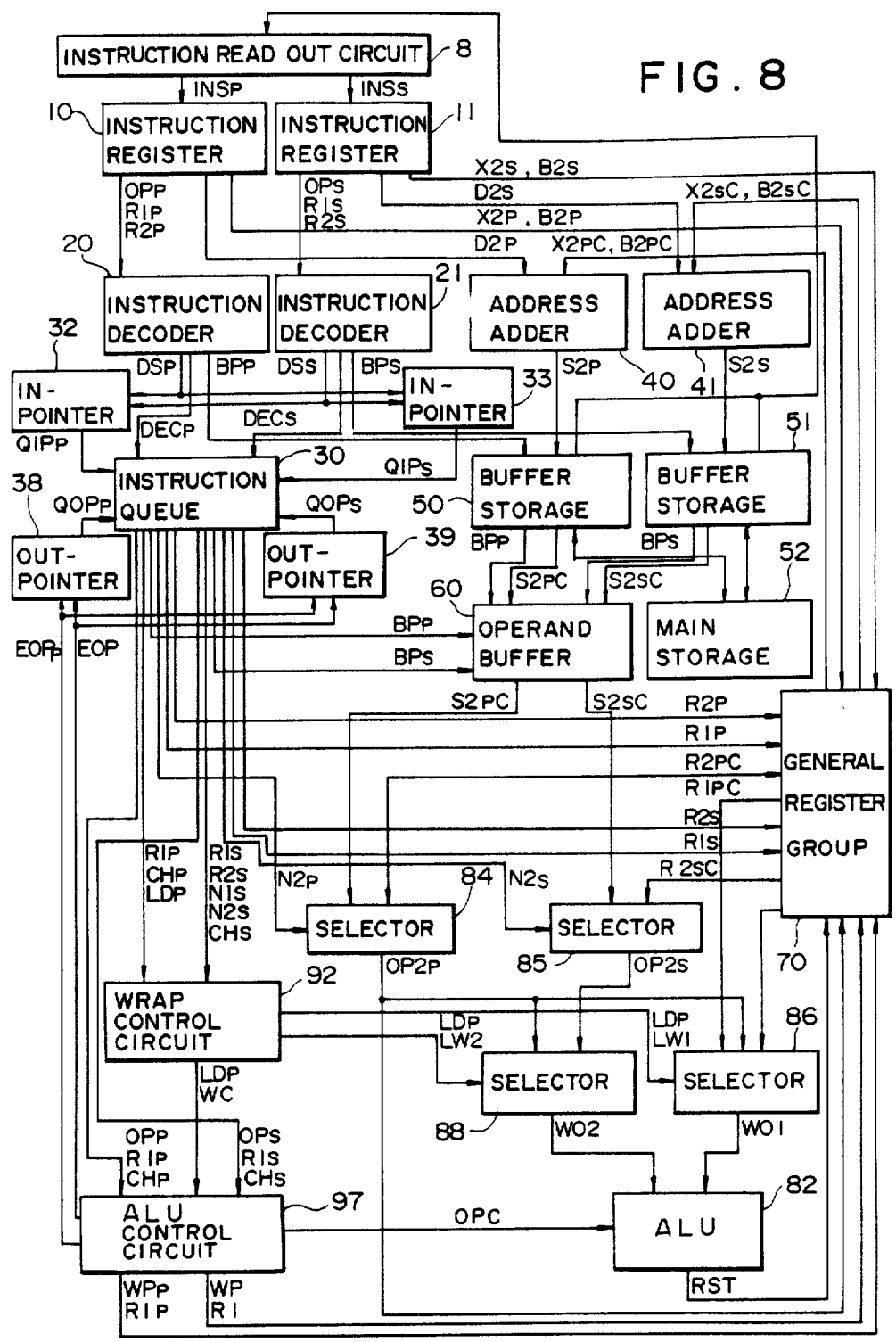
FIG. 8 is a block diagram showing an overall structure of another embodiment of the data processor according to the present invention.

FIG. 8 shows a block diagram indicating an overall structure of another embodiment of the data processor according to the present invention. In this embodiment, two ALUs are replaced with one ALU, wherein an idle ALU which needs not perform an arithmetic or logical operation during a LOAD process is utilized for the arithmetic or logical operation by the succeeding instruction. According to the present invention aiming at solving a delay in the processing to be caused by operand conflict, if a preceding instruction in conflict with a succeeding instruction is a so-called LOAD instruction which requires no operation by an ALU, the operand read by the preceding instruction is supplied to the succeeding instruction as an operand to be read by the succeeding instruction.

In the second embodiment shown in FIG. 8, the two ALUs 80 and 81 in the first embodiment of FIG. 1 are replaced with one ALU 82. Therefore, there are other different circuit portions in the data processor. The following description is directed only to those elements different from the first embodiment shown in FIG. 1.

Two out-pointers 38 and 39 are incremented by two only when a LOAD instruction is used as a preceding instruction and both operation end signals EOPp for a selector 84 and EOP for the ALU 82 are outputted from an ALU control circuit 97. The two out-pointers 38 and 39 are incremented by one when the ALU control circuit outputs only the operation end signal EOP for the ALU 82.

In the embodiment shown in FIG. 8, the present invention can be realized mainly by a wrap control circuit 92, the ALU control circuit 97 and selectors 86 and 88.

Figure 9:
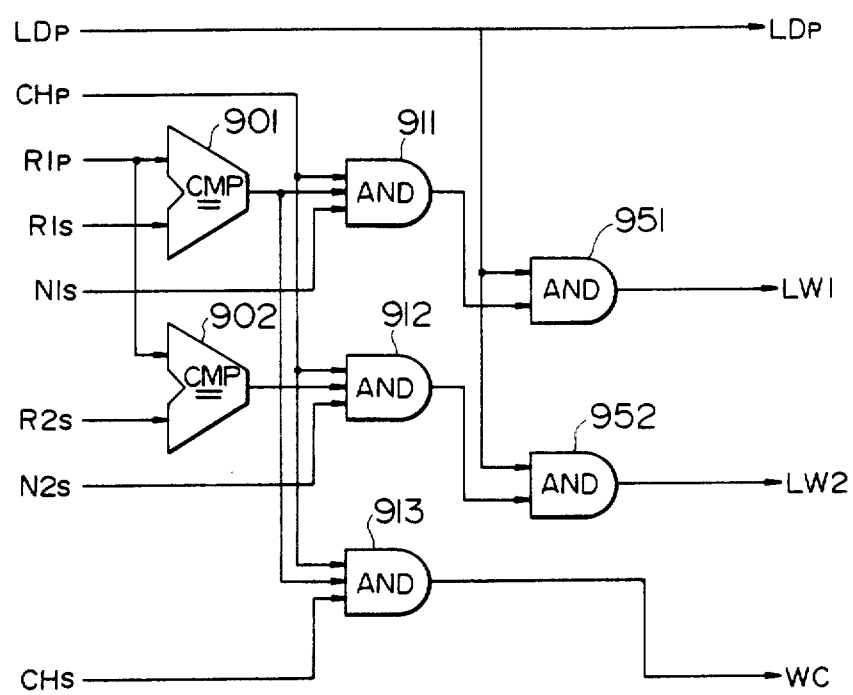
FIG. 9 is a detailed block diagram of the wrap control circuit 92 of the embodiment shown in FIG. 8.

FIG. 9 shows a block diagram illustrating the internal structure of the wrap control circuit 92. In this embodiment, since arithmetic or logical operation by a succeeding instruction can be performed only if the preceding instruction is a LOAD instruction, it is not necessary for the wrap control circuit 90 to generate an operand conflict detection signal OC indicative of an operand conflict between the preceding and succeeding instructions. Instead, the wrap control circuit 92 outputs instruction decode information LDp indicative of that the preceding instruction is a LOAD instruction, directly to the ALU control circuit 97. Particularly, an operand conflict between the preceding and succeeding instructions causes to inhibit the arithmetic or logical operation by the succeeding instruction in the embodiment of FIG. 1, whereas in the embodiment of FIG. 8 that the preceding instruction is not a LOAD instruction causes to inhibit the arithmetic or logical operation by the succeeding instruction. Consequently, the wrap control circuit 92 is constructed by removing the inverter 920, AND gates 931 and 932 and OR gate 940 from the wrap circuit 90 shown in FIG. 6.

Referring to FIG. 8, the selector 86 performs an operation to select, as a first operand WO1 to be sent to the ALU 82 which performs arithmetic or logical operation of the preceding instruction or the succeeding instruction, a first operand R1pC of the preceding instruction in the case where the instruction decode information LDp indicative of that the preceding instruction is a LOAD instruction is not delivered, and if delivered and at the same time if an operand wrap-around indicating signal LW1 is not delivered, performs an operation to select a first operand R1sC of the succeeding instruction, or alternatively if the operand wrap-around indicating signal LW1 is delivered, performs an operation to select a second operand OP2p of the preceding instruction. On the other hand, the selector 89 performs an operation to select, as a second operand W02s to be sent to the ALU 82, a second operand OP2p of the preceding instruction in the case where the instruction decode information LDp is not delivered, and if delivered and at the same time if an operand wrap-around indicating signal LW2 is not delivered, performs an operation to select a second operand OP2s of the succeeding instruction, or alternatively if the operand wrap-around indicating signal LW2 is delivered, performs an operation to select a second operand OP2p of the preceding instruction.

Figure 10:
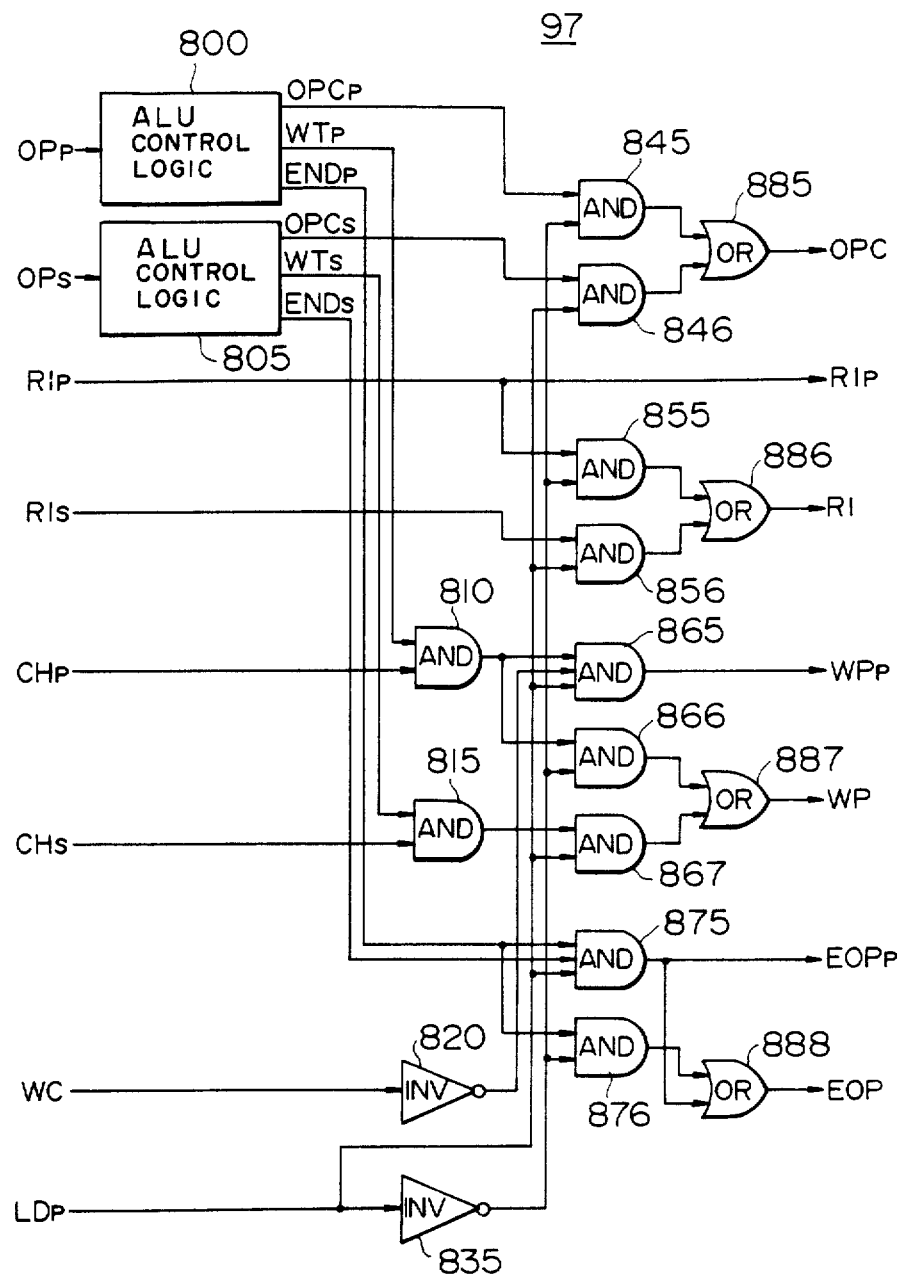
FIG. 10 is a detailed block diagram of the ALU control circuit 97 of the embodiment shown in FIG. 8.

FIG. 10 shows a block diagram indicating the internal structure of the ALU control circuit 97. A main difference from the ALU control circuit 95 shown in FIG. 7 is that instead of the operand conflict detection signal OC indicative of an operand conflict between the preceding and succeeding instructions, instruction decode information LDp indicative of that the preceding instruction is a LOAD instruction is used. The instruction decode information LDp indicative of that the preceding instruction is a LOAD instruction, and a write inhibit signal WC for inhibiting a write operation of an operation result by the preceding instruction are sent from the wrap control circuit 92 to the ALU control unit 97.

In the ALU control circuit shown in FIG. 10, as described previously, the ALU control logic 800 (805) generates OPCp (OPCs) for controlling operation of the ALU, WTp (TWs) indicating a write timing of an operation result and ENDp (ENDs) indicating the end of an arithmetic or logical operation, based on the instruction decode information OPp (OPs) indicating the type of operations of the preceding (succeeding) instruction. An instruction decode information CHp (CHs) indicative of that the preceding (succeeding) instruction writes an operation result into the general register group 70 is synchronized with the write timing WTp (WTs) at an AND gate 810 (815).

An output from an inverter 820 indicates that it is not necessary to inhibit a write operation of the operation result by the preceding instruction. An output from an inverter 835 indicates that the preceding instruction is not a LOAD instruction. Accordingly, an output from an AND gate 845 causes to output an operation control signal for the preceding instruction to the ALU in the case the preceding instruction is not a LOAD instruction. Alternatively, an output from an AND gate 846 causes to output an operation control signal for the succeeding instruction to the ALU, in the case the preceding instruction is a LOAD instruction. An OR gate 885 outputs the operation control signal OPC selected by the AND gates 845 and 846.

R1p designating a register of the general register group 70 into which an output OP2pf from a selector 84 is written by the preceding instruction, is directly sent to the general purpose register 70. An output of an AND gate 855 designates a register of the general register group 70 into which an operation result of the ALU 82 by the preceding instruction is written, in the case where the preceding instruction is not a LOAD instruction. Alternatively, an output of an AND gate 856 designates a register of the general register group 70 into which an operation result of the ALU 82 by the succeeding instruction is written, in the case where the preceding instruction is a LOAD instruction. An output from an OR gate 886 designates a register selected by the AND gates 855 and 856 into which an operation result by the ALU 82 is written.

If it is not necessary to inhibit a write operation of an operation result by the preceding instruction and if the preceding instruction is a LOAD instruction, an AND gate 865 outputs a write enable signal WPp for enabling a write operation of an output OP2p from the selector 84 into the general register group 70 by the preceding instruction. If the preceding instruction is not a LOAD instruction, an output from an AND gate 866 allows the preceding instruction to write an operation result by the ALU 82 into the general register group 70. Also if the preceding instruction is a LOAD instruction, an output from an AND gate 867 allows the succeeding instruction to write an operation result by the ALU 82 into the general register group 70. When one of the AND gates 866 and 867 allows a write operation of an operation result by the ALU 82, an OR gate 887 outputs a write enable signal WP. The write enable signals WPp and WP are sent to the general register group 70.

An operation end signal EOPp is outputted from an AND gate 875 on the condition that the preceding instruction is a LOAD instruction, the preceding instruction has completed its arithmetic or logical operation by writing an output OP2p from the selector 84 into the general register group 70, and the succeeding instruction has also completed its operation at the ALU 82. An output from an AND gate 876 indicates that the preceding instruction has completed its arithmetic or logical operation at the ALU 82 in the case where the preceding instruction is not a LOAD instruction. An OR gate 888 outputs an operation end signal EOP when one of the AND gates 875 and 876 indicates the end of an arithmetic or logical operation of the preceding instruction. In other words, in the case where the preceding instruction is not a LOAD instruction and the instruction decode information LDp for the preceding instruction is not sent from the wrap control circuit 92, the write enable signal WPp and the operation end signal EOPp are inhibited, to accordingly suspend an operation by the succeeding instruction. The operation end signals EOPp and EOP are sent to the out-pointers 38 and 39 to increment them.

With the above control sequence, the data processor shown in FIG. 8 can process the series of instructions shown in FIG. 4 in accordance with the timing chart shown in FIG. 5D.

According to the present invention, if the preceding instruction is a LOAD instruction and there is an operand conflict between the preceding and succeeding instructions, the operations for both the preceding and succeeding instructions can be carried out at the same time. Therefore, it is advantageous in that the problem of processing delay to be caused by the operand conflict can be solved, and the processing delay caused by other factors such as a complicated arithmetic or logical operation can be reduced.

What is claimed is:

1. A data processor for parallelly executing a plurality of instructions in successive operation stage, comprising:
   (a) a storage for storing operands;
   (b) a group of registers each for storing an operand;
   (c) operand storing means for storing operands of a plurality of instructions, said operands being read from said storage thereto;
   (d) means for decoding instructions to be executed and providing decode information of at least two instructions, at least one of which is to be subjected to an arithmetic or logical operation;
   (e) instruction detection means for detecting, based on said instruction decode information of said at least two instructions supplied from said decode means, that a preceding instruction among said at least two instructions requests reading of an operand from said storage or from said register group and writing of said operand into a register of said register group without performing an arithmetic or logical operation on said operand, and that a succeeding instruction among said at least two instructions requests reading of said operand in said register and performing an arithmetic or logical operation thereon; and
   (f) execution means responsive to the detection by said instruction detection means for concurrently performing arithmetic or logical operation stages in the execution of said preceding instruction and said succeeding instruction.

2. A data processor according to claim 1 wherein said execution means comprises:
   (f1) at least one operation means for performing an arithmetic or logical operation;
   (f2) means for supplying the operand requested by said preceding instruction from said operand means or from one register of said register group to said at least one operation means; and
   (f3) means for causing said at least one operation means to perform the arithmetic or logical operation requested by said succeeding instruction on said supplied operand.

3. A data processor according to claim 2, wherein said execution means includes means for allowing writing of an operation result of said succeeding instruction outputted from said at least one operation means without writing said supplied operand of the preceding instruction into said one register of said register group, when said succeeding instruction requests writing of said operation result into said one register of said register group.

4. A data processor according to claim 2, wherein said execution means includes means for allowing writing of said supplied operand for the preceding instruction and allowing writing of an operation result of said succeeding instruction outputted from said at least one operation means, when said succeeding instruction requests writing of said operation result into a register different from said one register of said register group.

5. A data processor, comprising:
   (a) memory means for holding operands;
   (b) a plurality of registers for holding operands;
   (c) operation means for executing an arithmetic or logical operation;
   (d) load means connected to said memory means and said plurality of registers and responsive to a preceding instruction which requires transfer of an operand from said memory means to one of said plurality of registers for fetching the operand from said memory means and for writing the fetched operand into said one register;
   (e) detect means for detecting a succeeding instruction which requires execution of an arithmetic or logical operation on an operand held by said one register;
   (f) control means connected to said load means and said detect means and responsive to detection of the succeeding instruction for supplying the fetched operand to said operation means, before the fetched operand is written into said one register and for controlling said operation means so as to execute an operation required by the succeeding instruction on the fetched operand.

6. A data processor according to claim 5, wherein said control means includes means for allowing writing into said one register of an operation result of said succeeding instruction outputted from said at least one operation means without writing said fetched operand of the preceding instruction into said one register, when said succeeding instruction requests writing of said operation result into said one register of said plurality of registers.

7. A data processor according to claim 5, wherein said control means includes means for allowing writing of an operation result of said succeeding instruction outputted from said operation means into another one of said plurality of registers in parallel to writing of the fetched operand into said one register, when said succeeding instruction requests writing of said operation result into said another register.

* * * * *